(12) United States Patent
Thompson

(10) Patent No.: US 8,291,208 B2
(45) Date of Patent: *Oct. 16, 2012

(54) BIOS BOOTABLE RAID SUPPORT

(75) Inventor: Mark J. Thompson, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/102,365

(22) Filed: May 6, 2011

(65) Prior Publication Data

US 2011/0208957 A1    Aug. 25, 2011

Related U.S. Application Data

(63) Continuation of application No. 11/517,778, filed on Sep. 8, 2006, now Pat. No. 7,958,343.

(51) Int. Cl.
  *G06F 9/00* (2006.01)
  *G06F 9/24* (2006.01)
  *G06F 15/177* (2006.01)

(52) U.S. Cl. ............ 713/1; 713/2; 711/100; 711/114

(58) Field of Classification Search .......... 713/1, 2; 711/100, 114
See application file for complete search history.

(56) References Cited

U.S. PATENT DOCUMENTS

| | | | |
|---|---|---|---|
| 6,279,109 B1 | 8/2001 | Brundridge | |
| 6,401,140 B1 | 6/2002 | Wu | |
| 6,651,165 B1 | 11/2003 | Johnson | |
| 6,694,479 B1 | 2/2004 | Murthy et al. | |
| 6,898,668 B2 | 5/2005 | Thompson et al. | |
| 6,904,497 B1 * | 6/2005 | Beckett | 711/114 |
| 6,918,007 B2 | 7/2005 | Chang et al. | |
| 7,281,089 B2 | 10/2007 | Thompson et al. | |
| 7,313,721 B2 | 12/2007 | Ashmore | |
| 7,529,968 B2 | 5/2009 | Prabhakaran | |
| 2002/0194528 A1 | 12/2002 | Hart | |
| 2005/0120170 A1 | 6/2005 | Zhu | |
| 2005/0283655 A1 | 12/2005 | Ashmore | |
| 2007/0150651 A1 | 6/2007 | Nemiroff et al. | |
| 2007/0168701 A1 | 7/2007 | Prabhakaran | |
| 2007/0294582 A1 | 12/2007 | Rangarajan et al. | |

* cited by examiner

*Primary Examiner* — Jaweed A Abbaszadeh

(57) ABSTRACT

A computing apparatus comprises a persistent storage comprising a system code that implements Redundant Array of Independent Disks (RAID) protection on a boot volume.

20 Claims, 12 Drawing Sheets

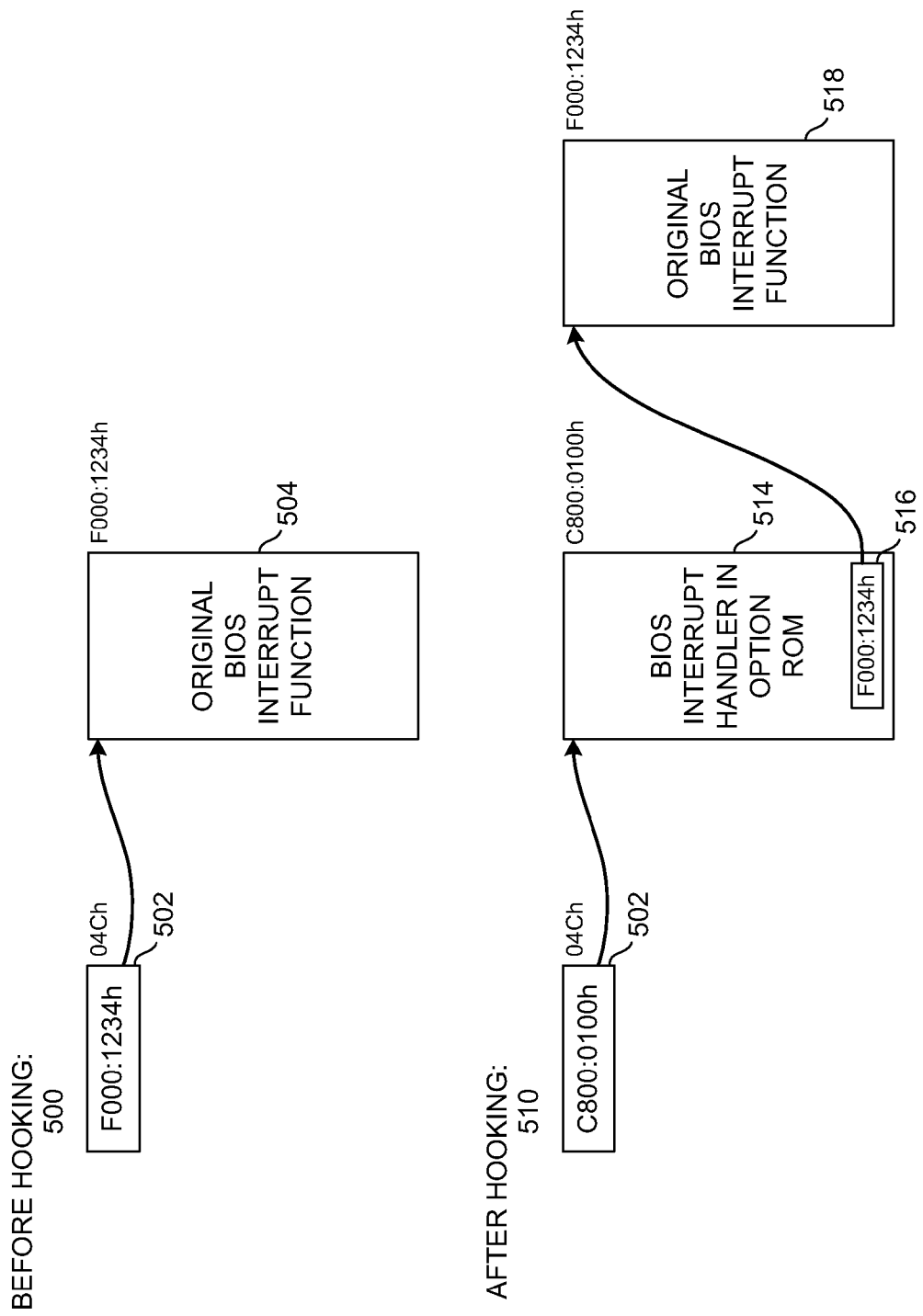

BIOS BOOTABLE RAID SUPPORT

RELATED APPLICATION

This application is a continuation of U.S. application Ser. No. 11/517,778, filed on Sep. 8, 2006, now U.S. Pat. No. 7,958,343 entitled "BIOS BOOTABLE RAID SUPPORT," which is herein included by reference in its entirety for all purposes.

BACKGROUND

RAID technology in data processing systems refers to a Redundant Array of Independent Disks, a system of multiple hard disk drives that share or replicate data among the drives. Multiple versions of RAID technology have been developed to enable increased data integrity, fault-tolerance, throughput, and/or capacity in comparison to single drives. RAID enables combination of multiple readily available and low-cost devices into an array with larger capacity, reliability, and/or speed.

The various versions or levels of RAID technology include RAID 0 with data striping that breaks data into smaller chunks and distributes the chunks among multiple drives to enhance throughput, but does not protect data. RAID 1 enables mirroring, which is copying of data onto at least one other drive, ensuring duplication so that data lost in a disk failure can be restored. RAID 0 and 1 can be combined to facilitate both throughput and data protection. RAID 5 strips both data and parity information across three or more drives and is also fault tolerant.

RAID technology can be implemented either in hardware or software. Software RAID typically supports RAID 0 and 1 so that RAID functions are executed by a host Central Processing Unit (CPU), possibly causing a substantial reduction in performance of other computations, particularly during performance of RAID 5 writes since parity is calculated. Hardware RAID implementations offload processor intensive RAID operations from the host CPU to enhance performance and fault-tolerance and are generally richer in features.

BRIEF DESCRIPTION OF THE DRAWINGS

Embodiments of the invention relating to both structure and method of operation may best be understood by referring to the following description and accompanying drawings:

FIG. 5 is a data structure diagram that illustrates an example of hooking of an interrupt.

DETAILED DESCRIPTION

Software Redundant Array of Independent Disks (RAID) drivers may be deficient in comparison to hardware RAID controllers due to lack of RAID protection on the boot volume. An illustrative system includes RAID protection on the boot volume. In addition, Basic Integrated Operating System (BIOS) support in an Option Read-Only Memory (ROM) of hardware RAID controllers is designed to operate only with specific controller hardware. One example of a BIOS interrupt vector is interrupt 13h for usage with an Intel-based system where the designation 13h identifies a hexadecimal number. Other applications may use another interrupt vector number. Accordingly, the illustrative system and associated method enables operation with practically any bootable disk controller.

Typical software RAID drivers are loaded after the operating system is booted and do not include RAID protection on the boot volume, resulting in an inability to boot from the system if failure of a boot drive occurs, particularly when the boot volume is on a RAID volume that utilizes striping. In contrast, Hardware RAID controllers are more expensive and are tied to specific hardware.

The illustrative BIOS bootable RAID support functionality enables RAID support for a boot volume, including the possibility of RAID-on-RAID support when used in conjunction with a hardware RAID controller. The BIOS bootable RAID support implementation can enable extended functionality for System ROMs for various computing devices. The BIOS bootable RAID support functionality can be independent of the type of disks and disk controllers installed in the computing device (as long as interrupt 13h BIOS support is implemented) and thus can be correctly and operably implemented independently of any vendor specification.

The BIOS bootable RAID support functionality can be implemented in the absence of RAID support in a controller Option ROM, and can be suitably implemented in a System ROM. As software RAID functionality may become increasingly popular due to continuing cost pressures and faster host processor CPU speed, possibly enabling software RAID configurations to become faster than hardware implementations in most cases, a RAID-protected boot volume for software RAID applications may become highly desirable.

Figure 1:
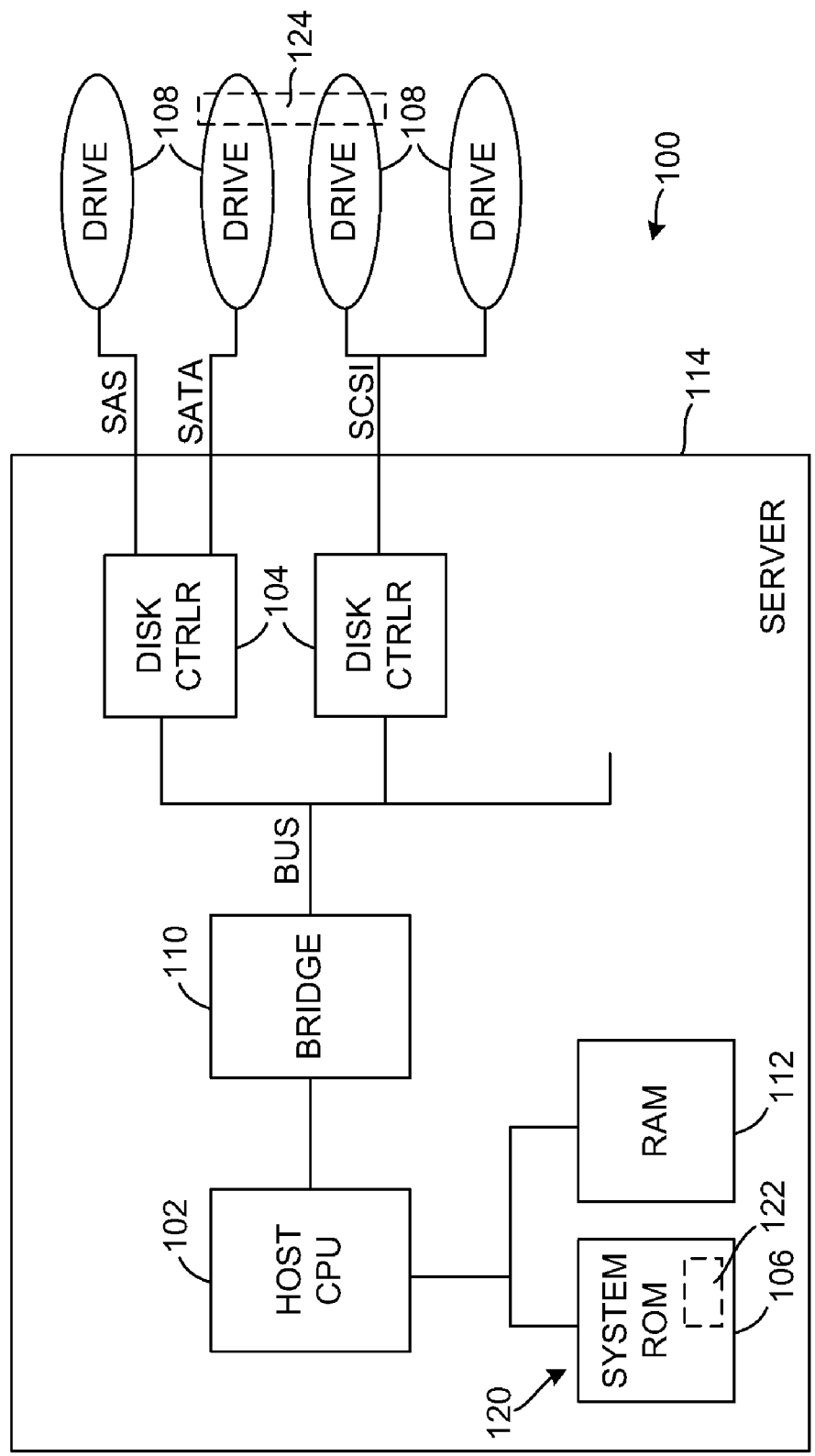
FIG. 1 is a highly schematic block diagram depicting an embodiment of a data processing system that implements bootable Redundant Array of Independent Disks (RAID) support.

An illustrative data processing system 100 and System Read-Only Memory (ROM) 106 overcome these deficiencies. Referring to FIG. 1, a block diagram depicts an embodiment of a data processing system 100 that implements bootable Redundant Array of Independent Disks (RAID) support. The illustrative data processing system 100 comprises a processor 102 and one or more disk controllers 104 coupled to and controlled by the processor 102. The data processing system 100 further comprises a System Read-Only Memory (ROM) 106 that is coupled to the processor 102 and includes a System Basic Integrated Operating System (BIOS) that implements Redundant Array of Independent Disks (RAID) protection on a boot volume.

The illustrative bootable RAID support in BIOS can operate in the manner of a software RAID level implemented in System ROM.

Executable code in the System ROM virtualizes the disk drives as a set of physical interrupt 13h units and creates a new virtual interrupt 13h unit out of the units.

The data processing system 100 interfaces to one or more disk drives 108 via a bus connection between the disk controllers 104 and the drives 108. In various embodiments, the bus connection interface may be made by one or more storage bus technologies such as Serial AT Attachment standard (SATA), Small Computer Systems Interface (SCSI), Serial Attached SCSI (SAS), and other suitable bus technologies for transferring data bidirectionally between the disk controllers 104 and the disk drives 108.

In the illustrative embodiments, the processor 102 couples to the disk controllers 104 through a bridge 110. The illustrative disk controllers 104 are depicted as Peripheral Component Interconnect (PCI) disk controllers that connect to the bridge 110 via a PCI bus. In various embodiments, the disk controllers 104 typically can be embedded on a mother board, can be plug-in Host Bus Adapters (HBAs), or can be attached in any suitable manner. In various embodiments, the internal bus may be a technology other than PCI such as PCI-Extended (PCI-X), PCI-Express (PCI-E), Extended Industry Standard Architecture (EISA), or any other suitable technology.

The processor 102 typically includes memory such as Random Access Memory (RAM) 112, in addition to the System ROM 106.

The illustrative embodiment depicts the processor 102 as an Intel x86 technology processor in an x86 server 114. A server is a computing system that supplies services to other computing systems. The disclosed embodiment depicts the processor for usage in a server for illustrative purposes but may be implemented in any suitable computing device.

A drawback of conventional software RAID drivers over hardware RAID controllers is lack of RAID protection on the boot volume.

Accordingly, in an embodiment of a computing apparatus 120, a System ROM 106 comprises a System BIOS 122 that implements RAID protection on a boot volume 124. The illustrative computing apparatus 120 implements RAID protection on the boot volume 124 as part of the System BIOS that functions with disk controllers of various models and from various manufacturers and/or suppliers that supply interrupt 13h BIOS support. Accordingly, the System BIOS 122 is configured to implement RAID protection that supports multiple different disks and disk controllers for designs of a various manufacturers.

The RAID protection implementation is adapted to coexist with software RAID drivers that are loaded by an operating system after the system is bootstrap loaded. Thus, the System BIOS 122 implements RAID protection adapted to accommodate and function in combination with software RAID drivers loaded after the operating system is booted.

In some embodiments, the System BIOS 122 executes during system Power-On Self Test and conceals a configurable number of physical disk drives 108 attached to a disk controller 104. The System BIOS 122 is operational as a distinct RAID device that implements RAID mapping technology. Thus, the illustrative system enables RAID support at the System BIOS layer. The RAID protection of the System BIOS 122 logically re-vectors or "hooks" in during system Power-On Self Test (POST) and "hides" the configurable number of physical drives, which are attached to any disk controller, from the operating system. The illustrative RAID protection implementation emulates and operates as a new RAID device using standard RAID mapping technology. The illustrative RAID code is implemented in the System BIOS 122 and can operate with essentially any disk controller adapted for interrupt 13h BIOS support.

In an illustrative embodiment, the System BIOS 122 implements RAID protection to function in cooperation with a plurality of hardware RAID controllers in a respective plurality of hardware disk controllers for RAID-on-RAID support and extended redundancy protection. The RAID-on-RAID support can be used with existing RAID controllers to enable an extra level of redundancy protection.

Figure 2A:
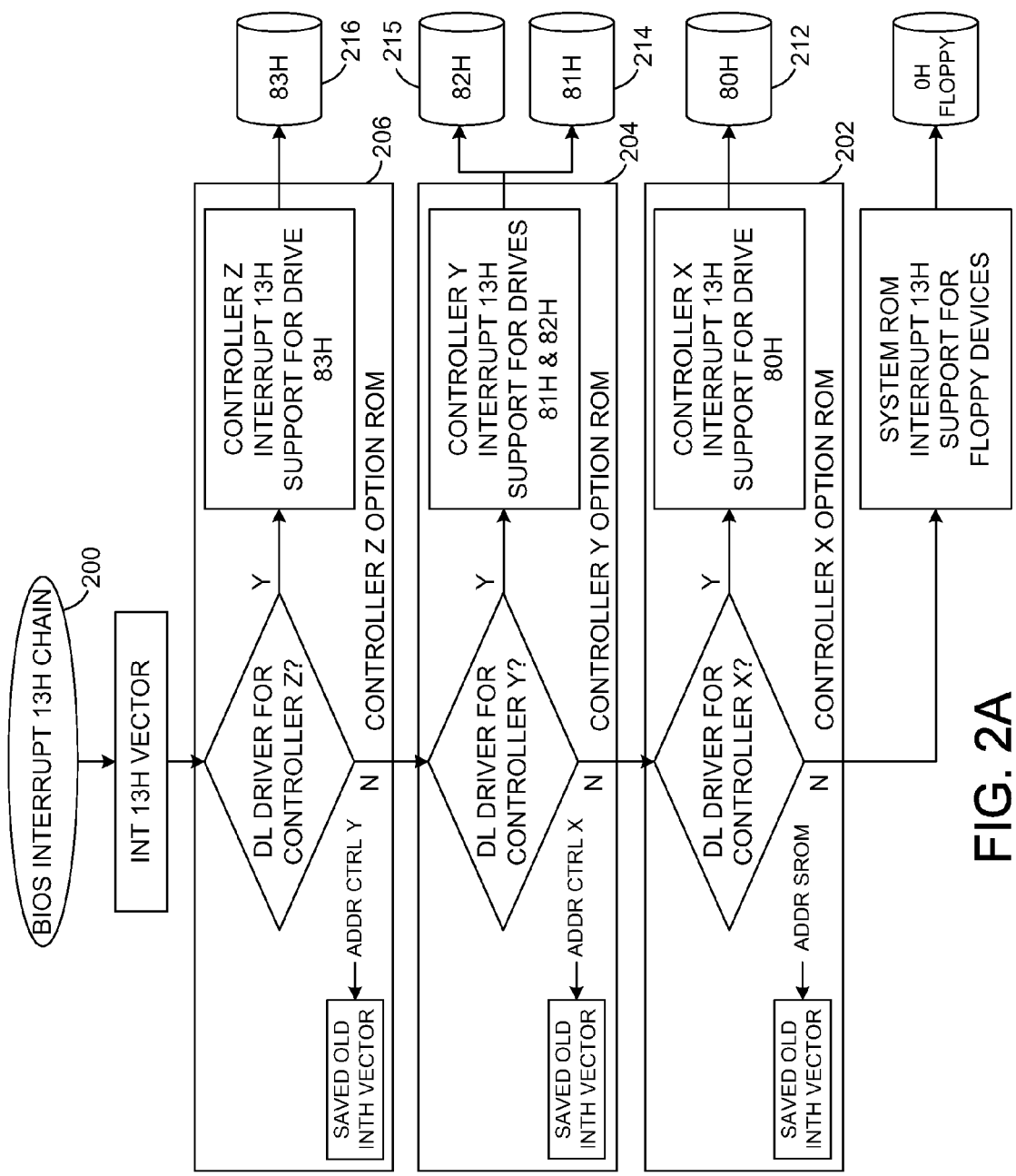
FIGS. 2A and 2B are schematic block diagrams showing embodiments of Basic Integrated Operating System (BIOS) interrupt chains.

Referring to FIG. 2A, a schematic block diagram depicts operation of a BIOS interrupt 13h chain 200. The example shows operation of a general case data processing system that includes multiple controllers for illustrative purposes, although a configuration with a single controller can be implemented. The most typical configuration includes a single controller with multiple attached disk drives. When a controller's Option ROM loads, an initialization routine or process performs a surveillance operation and discovers the individual drives attached to the controller. In the illustrative example, initialization code in the Option ROM of controllers X, Y, and Z has constructed an interrupt 13h chain 200 that is completely or partially transversed every time an interrupt 13h BIOS call is invoked. For embedded controllers, controller BIOS code is commonly implemented as part of the System ROM and supplies BIOS functions that are called by the System BIOS, for example as a boot device that connects a device—here controllers X, Y, and Z—to the system once the Option ROM is loaded.

The BIOS interrupt 13h chain 200 is a logical construct that is created as the initialization code in each controller Option ROM is executed during POST. The Option ROM initialization code discovers each disk drive attached to the controller and hooks interrupt 13h to enable support for the attached disk drives. Controller X 202 has hooked interrupt 13h and assigned the attached drive an interrupt 13h drive number of 80h 212. Controller X discovers disk drive 80h 212 through operation of the initialization code within the Option ROM for controller X, which is the first disk controller Option ROM to execute during POST. Since each controller Option ROM uses the next available interrupt 13h unit number, the block order depicted in FIG. 2A is inverted in comparison to the order that initialization code in the Option ROMs is executed during POST.

Int 13h is an interrupt vector in an x86 based computer system wherein INT is an Intel x86 instruction that evokes a software interrupt and 13h is the hexadecimal number vector passed to the instruction. BIOS typically configures a real mode interrupt handler at the 13h vector that performs sector-based hard disk and floppy disk read and write services using Cylinder Head Sector (CHS) addressing. The vector is a 4-byte memory address representing the starting memory address of the BIOS interrupt handler function. The interrupt 13h vector is stored at memory location 4Ch in Intel x86 systems. In a real mode operating system, calling Int 13h jumps into Option ROM or System BIOS code for low level disk services, executing sector-based reads and/or writes for the calling application.

The Option ROM initialization code on the first controller discovers the first hard disk drive 80h 212 and logically re-vectors or hooks in at the appropriate unit number. Hooking an interrupt vector is a well-known technique of saving an existing interrupt vector address, in the illustrative case a 4-byte address in memory location 4Ch, and then storing the address of a new interrupt handler in the memory location. When the interrupt is subsequently invoked, control first passes to the new interrupt handler, and can be forwarded to the original interrupt handler in the chain by simply calling or jumping to the original saved interrupt vector address. Referring to FIG. 5, a data structure diagram illustrates an example of hooking of an interrupt. Before hooking 500, address 04Ch 502, which relates to four times vector 13h, specifies the address (F000:1234h) of code that will be executed for the interrupt 13h instruction. The address 04Ch 502 points to the original BIOS interrupt function 504, in the example at F000: 1234h. The starting memory address for the BIOS interrupt function 504 is specified in vector F000:1234h, for example, which can relate to System ROM interrupt 13h support for floppy devices. After hooking 510, address 04Ch 502 specifies the address (C800:0100h) for the BIOS interrupt handler 514 in Option ROM. The BIOS interrupt handler 514 has a memory or register that holds the original vector 516 that is saved for chaining. The original vector points to the original BIOS interrupt handler 518, for example F000:1234h. Control is normally passed to the original BIOS function if the drive unit number DL is not handled by the Option ROM.

The Int 13h system calls use a drive index register (DL) in x86 architecture to specify the disk drive. The first fixed disk drive by convention starts at unit 80h and increments. Each disk drive is discovered by the Option ROM during power-up and is assigned a unit number. Accordingly, controller X interrupt 13h 202 supports disk drive 80h 212, controller Y interrupt 13h 204 supports drives 81h 214 and 82h 215, and controller X interrupt 13h 206 supports drive 83h. Option ROM loads it and executes interrupt 13h support to read and write data from the appropriate drives. The interrupt 13h support is installed in the illustrative system with multiple controllers and drives whereby multiple controllers' Option ROMs are run and each assigns interrupt 13h unit numbers to the drives that are found by the controllers.

Figure 2B:
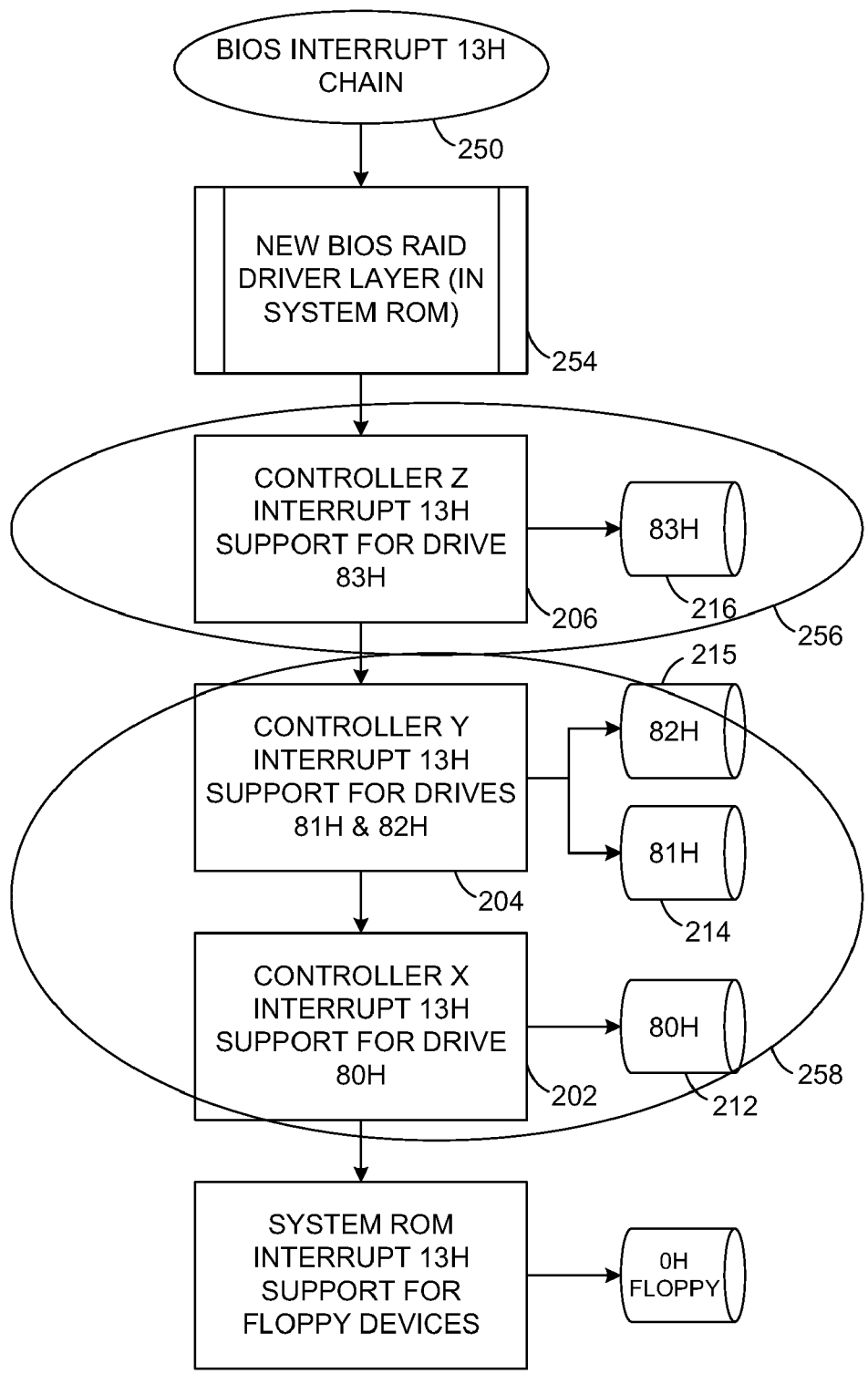

Referring to FIG. 2B, a schematic block diagram illustrates an embodiment of a BIOS 13h chain 250 with bootable RAID support. When implemented in an x86 server, the bootable RAID support hooks into the BIOS interrupt 13h chain 250, enabling various disk access functions when loading the operating system. The most common functions are typically read, write, and get drive parameters functions, although any suitable interrupt 13h functions can be enabled. As part of the system ROM, the illustrative bootable RAID support functionality typically hooks into interrupt 13h last, after other disk controllers have been logically hooked in or enabled. Accordingly, the system BIOS is configured to logically re-vector into a BIOS interrupt 13h execution chain 250 that performs a plurality of disk access functions during operating system loading. The system BIOS logically re-vectors into the BIOS interrupt 13h execution chain subsequent to re-vectoring into the BIOS interrupt 13h execution chain by at least one hardware disk controller.

For example, two disk controllers may have hooked into the BIOS interrupt 13h chain 250 before the bootable RAID support functionality loads. When the System ROM or operating system executes a BIOS interrupt 13h function, the interrupt 13h unit number of the target physical disk drive is specified when issuing one of the read, write, get drive parameters, or other functions. Interrupt 13h fixed drive unit numbers always start from 80h, so that if three disks are installed, the unit numbers are 80h, 81h, and 82h. The drives may be on different controllers, as depicted.

The System BIOS is configured for executing a BIOS interrupt 13h function specifying a target physical disk drive, which occurs subsequent to logically re-vectoring into the BIOS interrupt 13h execution chain.

The illustrative boot RAID support in BIOS creates a new BIOS RAID driver layer in system ROM 254. In the illustrative example, the BIOS RAID driver layer 254 presents only two fixed disk units to a host, specifically units 80h 212 and 81h 214.

In a simple RAID 5 case, the illustrative bootable RAID support logically re-vectors or hooks into the interrupt 13h chain 250 and hides the existing interrupt 13h units, presenting a new unit 80h 258 which is actually a RAID 5 volume made up of previous units 80h 212, 81h 214, and 82h 215. Thus, when communicating with the operating system, the bootable RAID support functionality will respond as BIOS interrupt 13h unit 80h 258, and will report that only one drive of the RAID set is present in the system. For each operating system request, the bootable RAID support functionality will generate the appropriate sequence of physical disk requests and pass the requests down to the earlier interrupt 13h handler using unit numbers 80h, 81h, and 82h. As depicted, bootable virtual unit 80h comprises a RAID 5 set using physical units 80h-82h 258.

The illustrative bootable RAID support functionality remaps any other units in the system that are not part of the RAID volume or volumes. In the example shown, a fixed disk unit 83h becomes unit 81h 256 after the bootable RAID support functionality is loaded, and the bootable RAID support process adjusts the system fixed disk count accordingly. Thus, virtual unit 81h passes through to unit 83h 256. Once the bootable RAID support process is loaded, all interrupt 13h BIOS requests pass through the process code, mapping drive numbers for drives that are not members of a RAID set in a trivial or automatic manner. Thus, the system BIOS is configured to remap system units that are not RAID volumes.

During the operating system boot process, the operating system communicates with the interrupt 13h BIOS interface via the bootable RAID support functionality, but at some point will load device drivers to communicate with the physical disk controllers and will find the individual disk drives. Immediately subsequent to finding the individual disk drives during operating system boot (drives are normally found via controller-specific operating system device drivers and not by interrupt 13h BIOS calls), the operating system will load a software RAID driver that may be present in the system to recognize presence of a RAID volume instead of individual disks.

Accordingly, an operating system bootstrap process can be configured to communicate with an interrupt 13h BIOS interface, load device drivers for communicating with physical disk driver controllers, and detect individual physical disk drives. Furthermore, the operating system bootstrap process can be configured to load a software RAID driver to recognize that the individual physical disk drives operate as a RAID volume.

A software RAID driver can normally recognize members of a software RAID volume by metadata stored on the drives. Accordingly, the illustrative bootable RAID support functionality is coordinated with a software RAID driver stack to ensure that both the bootable RAID support functionality and the software RAID driver stack correctly identify the operating RAID configuration. For example, if the RAID configuration is a five-drive RAID 4 volume, then both the software RAID driver and the BIOS bootable RAID support functionality are to correctly identify the configuration. Accordingly, the BIOS bootable RAID support functionality can interpret configuration information stored on disks by the software RAID stack. In other embodiments, the configuration information can be stored elsewhere on the disks, for example in a vendor-unique format.

Accordingly, in some embodiments, the operating system bootstrap process can be configured to load a software RAID driver that accesses metadata resident on the physical disk drives to detect and identify RAID classification of the RAID volume formed by the physical disk drives and position of each physical disk drive in the RAID volume.

The illustrative BIOS bootable RAID support functionality remaps the disk drives from the configuration as unit numbers are assigned by the controllers to a virtual drive set. Remapping proceeds as code in the System ROM causes interception of the interrupt 13h by logically re-vectoring into interrupt 13h. By logically re-vectoring into interrupt 13h, whenever an interrupt 13h BIOS call is invoked, the system directs the call first to the System ROM and the System ROM determines how to forward the BIOS call. In the illustrative example, the system, under control of the System ROM, examines the interrupt 13h request and divides the request into potentially multiple interrupt 13h requests for the different interrupt 13h units. Accordingly, the system combines units 80h, 81 h, and 82h into one RAID set and forms a virtual unit 80h so that when an interrupt 13h request is received and intercepted according to the System ROM via logical re-vectoring of the interrupt 13h vector, the system identifies the request as a request directed to unit 80h. On the basis of configuration information for the logical volume specifying correspondence to a virtual disk that is striped across drives 80h, 81 h, and 82h, the system generates physical requests corresponding to operation on a RAID controller for the appropriate individual drives. In some RAID configurations, for example RAID 5, the system also can generate requests to update parity. For example, one of the drives can contain parity information for fault tolerance in case a drive fails (for example, in RAID 5 parity data is distributed across all drives in the volume, although for any stripe of data, parity is on one drive).

Figure 3A:
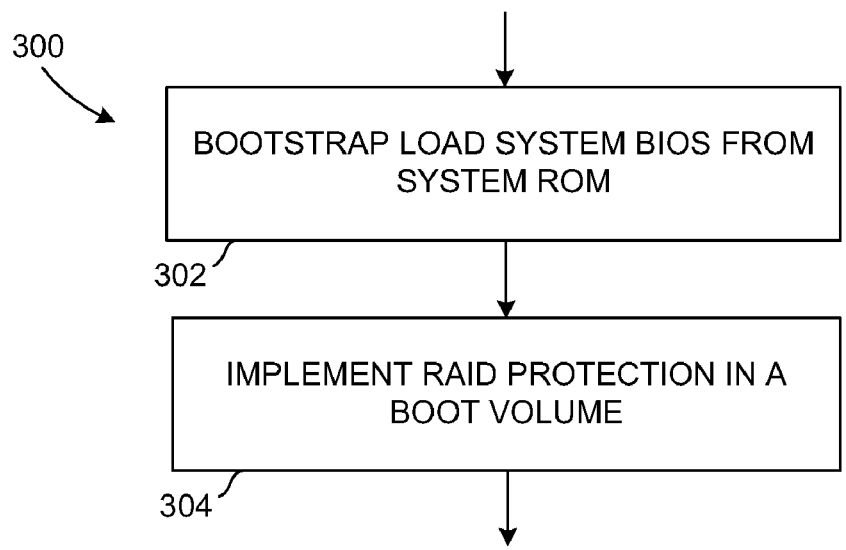
FIGS. 3A through 3D show multiple schematic flow charts depicting embodiments of methods for protecting data in a data processing system.

Referring to FIGS. 3A through 3D, multiple schematic flow charts depict embodiments of methods for protecting data in a data processing system. Referring to FIG. 3A, a method 300 comprises executing 302 a System BIOS from a System ROM to bootstrap load an operating system from a boot volume and implementing 304 RAID protection on the boot volume.

Figure 3B:
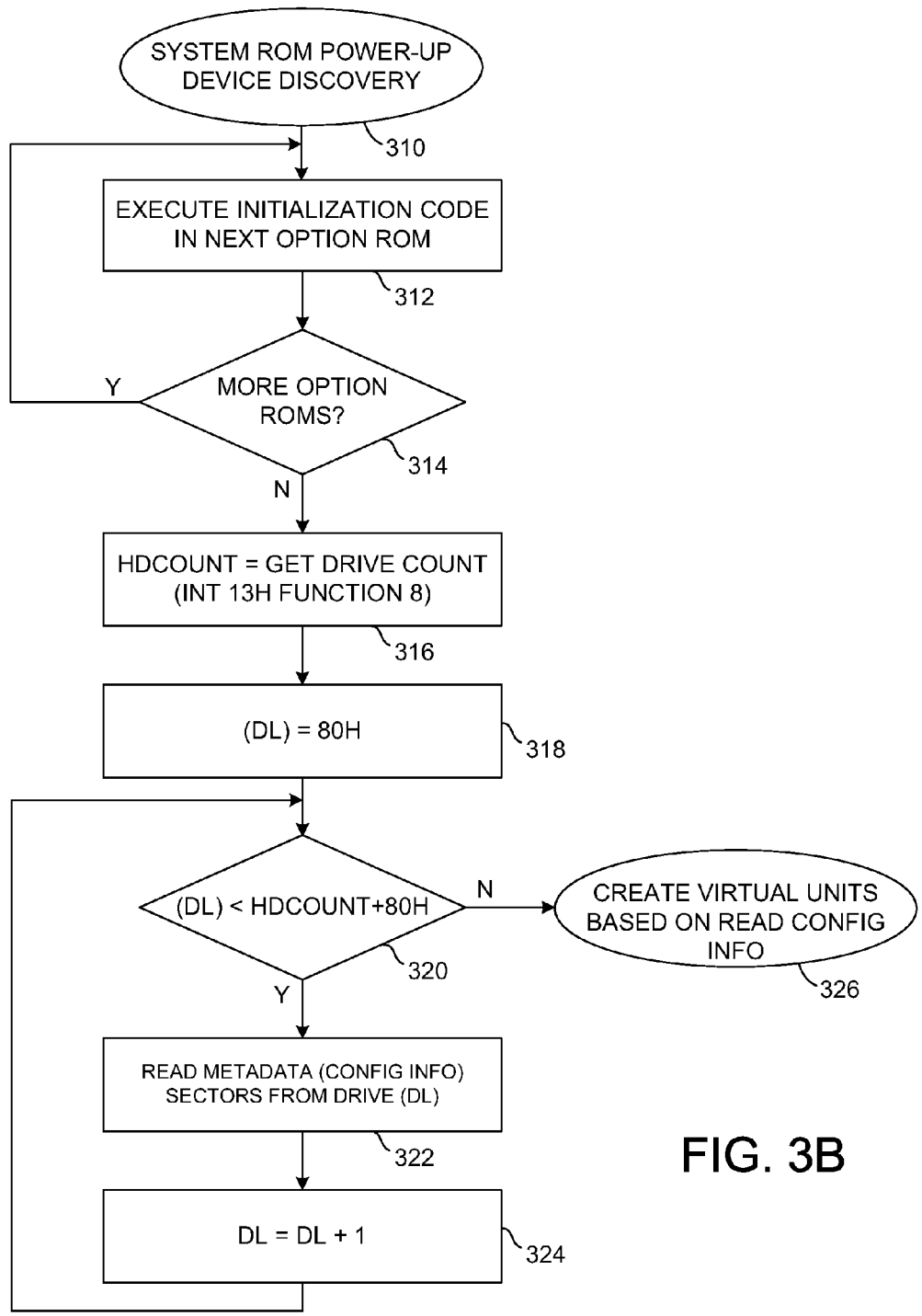

Referring to FIG. 3B, a flow chart shows an embodiment of a method 310 for device discovery on power-up that can be executed from System ROM. The method 310 comprises executing 312 initialization code in an option ROM. Option ROMs may hook interrupt 13h BIOS support for some disk units, for example disk units 80h, 81 h, 82h, 83h, and the like. If more option ROMs are available 314, the method re-vectors into interrupt 13h BIOS support for the available option ROMs.

A hard disk drive count (HDCOUNT) can be determined 316 via a Get Drive Count call, for example using an interrupt 13h function 8 call. Function 8 is actually known as "Get Drive Parameters" but returns drive count as well. The count can also be accessed from HDCOUNT which is normally stored in memory location 40:75h on Industry Standard Intel x86 systems. The drive number stored in register DL can be initialized 318 to drive unit 80h. So long as the drive number in DL has a value smaller than HDCOUNT+80h 320, metadata sectors holding configuration information can be read 322 from appropriate sectors on the drive. The drive number DL is incremented 324 so that metadata is read from multiple disk drives.

The RAID volume need not be composed of consecutive underlying physical disks. On subsequent boots, the interrupt 13h drive numbering may differ, for example if a drive is missing or failed. A signature and "drive position in the array" are stored on each physical drive to enable appropriate numbering.

When metadata is read for all drives, virtual RAID volumes are created 326 based on the metadata read from the disk drives.

Power-up initialization code that executes from the system ROM sequences through and reads from each of the disk drive devices using standard interrupt 13h functions. Metadata stored on the disk drive devices are read to determine which devices form a RAID group and to create a virtual drive using RAID operating techniques from multiple physical devices. The System ROM uses the interrupt 13h mechanism to access RAID configuration information stored as metadata on the disk or multiple disks. In some arrangements or embodiments, metadata can be stored on a drive in Disk Data Format (DDF) as specified by the Standard Networking Industry Association (SNIA). The standard for DDF defines a data structure describing formatting of data across disks in a RAID group and enables basic interoperability between different suppliers of RAID technology. The DDF standard enables identification and description of the RAID levels for drives so that if drives are moved from one controller model to a different model, the destination controller model can identify the RAID level and access data on the virtual RAID device. In the illustrative case, an industry standard such as DDF may be used so that the RAID configuration may be easily identified by both the System BIOS and the software RAID driver.

In other embodiments, configuration information can be stored in another location, for example in Non-Volatile Random Access Memory (NVRAM), on a server or other suitable device so that executable code in the System ROM for the server can identify that a Read/Write call is from a RAID group based on the information stored in NVRAM.

Storage of RAID information on the disk drive or similar storage devices, enables the information to be held local to the specific drive that is described by the information so that the information is moved when the drive is physically moved to a different system. In contrast, storage of the information in NVRAM, for example on a motherboard, is less flexible.

Figure 3C:
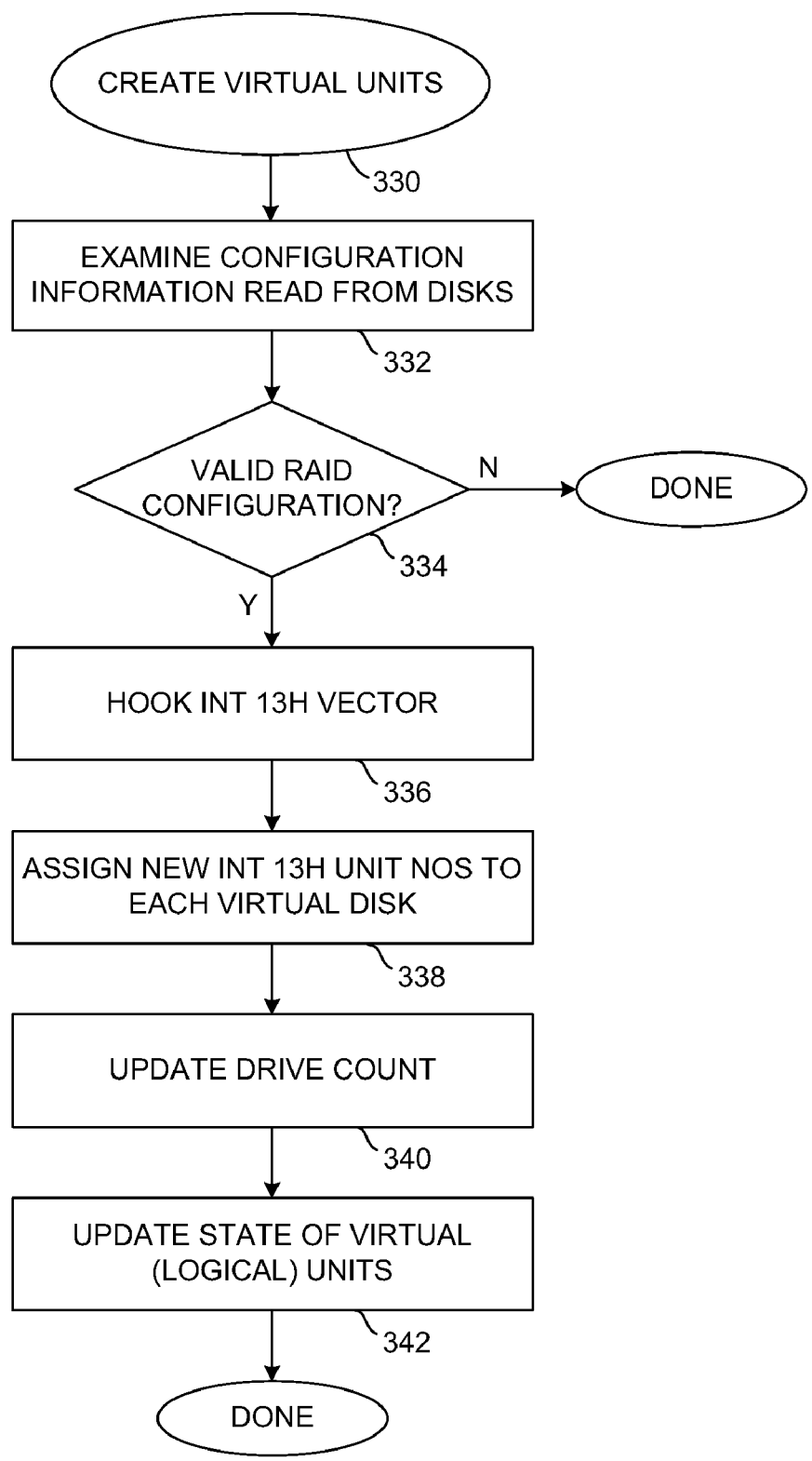

Referring to FIG. 3C, a schematic flow chart illustrates an embodiment of a method 330 for creating virtual RAID volumes. The method 330 comprises examining 332 configuration information on metadata read from the multiple disk drives and validating 334 RAID configuration. If the RAID configuration is valid 334, the method logically re-vectors 336 into interrupt 13h vector whereby subsequent 13h calls are diverted to system ROM and not option ROM. New interrupt 13h unit numbers are assigned 338 to virtual disks and unconfigured physical disks. Unconfigured disks are those without any configuration information encoded on the disk when the system is booted. The drive count is updated 340 and the state of virtual or logical units is updated 342. On Industry Standard Intel x86 computer systems, drive count (HDCOUNT) is usually stored in BIOS data area at location 40h:75h. Logical and/or virtual unit state may be good or operative, or may be degraded if a drive is missing, failed, or if more drives of multiple drives are missing or failed than a fault tolerance specification allows. State may change during interrupt 13h read and/or write operations. In the illustrative embodiment, hot-plug drive replacement and rebuild operations may not be performed by the System ROM but may instead be performed by the software RAID driver.

Figure 3D:
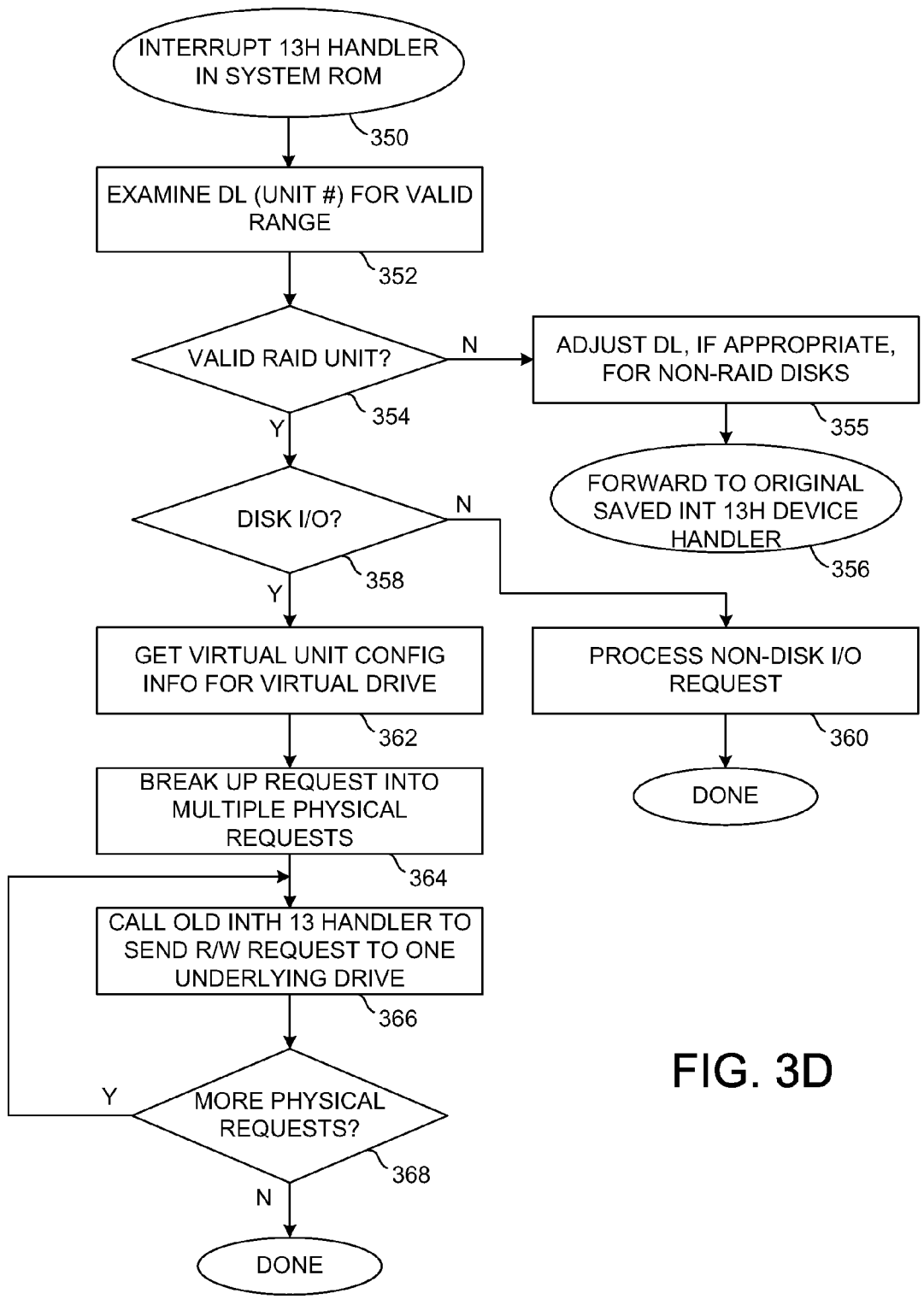

Referring to FIG. 3D, a schematic flow chart illustrates an embodiment of a method 350 for handling 13h interrupts in system ROM. The method 350 comprises examining 352 the interrupt 13h unit number for validity. In a particular implementation, the drive index register (DL) is examined 352 to determine whether the drive unit number is in the valid range from 80h to (80h+HDCOUNT−1). For an invalid unit number or when DL is not the unit number of the RAID volume(s) 354, execution is forwarded 356 to the original interrupt 13h handler. DL can be adjusted 355, if appropriate, for non-RAID disks for forwarding 356. DL may be modified before forwarding to the original interrupt 13h handler. For a valid unit number 354, the method 350 determines 358 whether the interrupt 13h request is a disk input/output (I/O) request. Specifically, the method determines 358 whether a request is a read/write request versus a request that does not use disk input/output operations such as a "Get Drive Capacity" operation. For a request that is not a disk I/O request 358, the request is processed 360. For a disk I/O request to a RAID volume 358, the method 350 comprises accessing 362 virtual unit configuration information for a virtual drive and dividing 364 the request into multiple requests for physical drives. The original request is broken 364 into multiple "physical requests" for underlying drives. The request is an interrupt 13h read or write operation to the virtual disk. Physical read or write requests are sent 366 to the underlying disk drives by calling the original interrupt 13h handler. The request is sent 366 by calling the interrupt 13h handler vector address that was saved before the System ROM hooked in. The interrupt handler determines 368 whether more physical requests for the underlying drives are due, looping to send additional read or write requests to the underlying physical drives for the multiple requests. The sequence of physical disk requests is dictated by the RAID level and state of the drives in the volume.

Figure 4A:
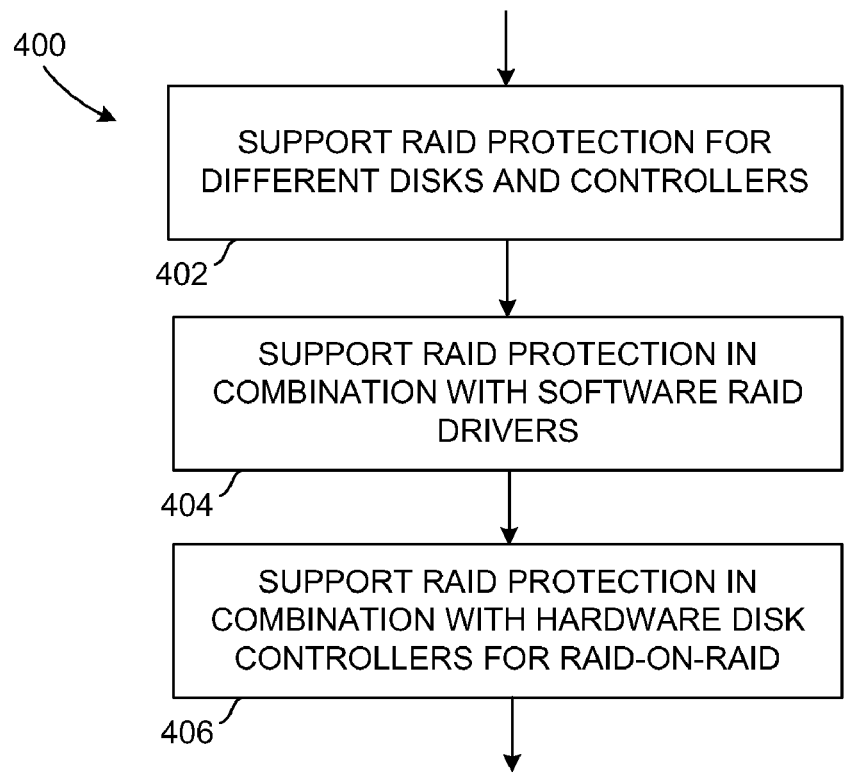
FIGS. 4A through 4D are multiple schematic flow charts showing additional embodiments of methods for protecting data in a data processing system.

Referring to FIGS. 4A through 4D, various flow charts depict embodiments of methods for protecting data in a data processing system. FIG. 4A shows a data protection method 400 comprising supporting 402 RAID protection for multiple different disks and disk controllers for designs of multiple manufacturers, and supporting 404 RAID protection in combination with software RAID drivers loaded by an operating system after system bootstrap loading. The method 400 further can comprise supporting 406 RAID protection in cooperation with multiple hardware RAID controllers in respective multiple hardware disk controllers for RAID-on-RAID support and extended redundancy protection.

Figure 4B:
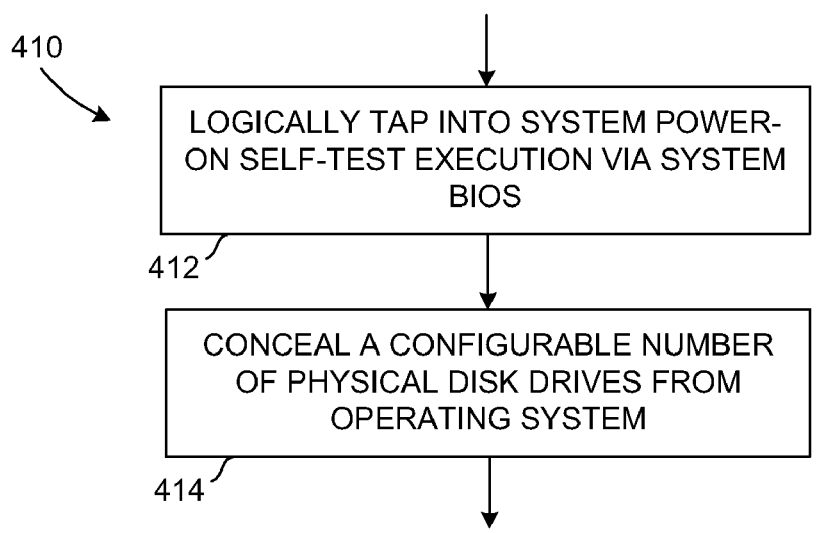

Referring to FIG. 4B, an embodiment of a data protection method 410 can comprise logically re-vectoring 412 into a system Power-On Self Test execution chain via the system BIOS and concealing 414 a configurable number of physical disk drives attached to a disk controller from an operating system during the boot process. The illustrative technique only conceals drives through interrupt 13h during operating system boot. The operating system's boot loader uses interrupt 13h, but once the operating system is fully running the technique has no effect so that a software RAID driver operates to conceal the physical drives.

Figure 4C:
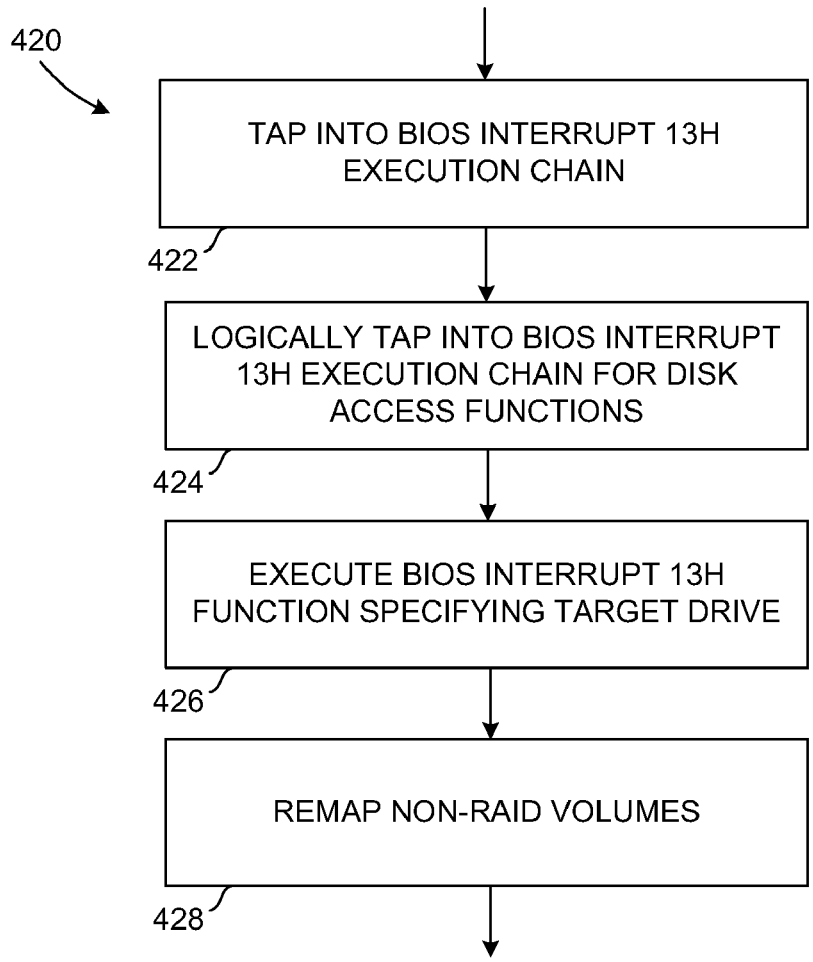

FIG. 4C illustrates an embodiment of a data protection method 420 comprising re-vectoring 422 into the BIOS interrupt 13h execution chain by at least one hardware disk controller and logically re-vectoring 424 into a BIOS interrupt 13h execution chain that performs multiple disk access functions during operating system loading. A BIOS interrupt 13h function is executed 426 specifying a target physical disk drive. System units that are not RAID volumes are remapped 428.

Figure 4D:
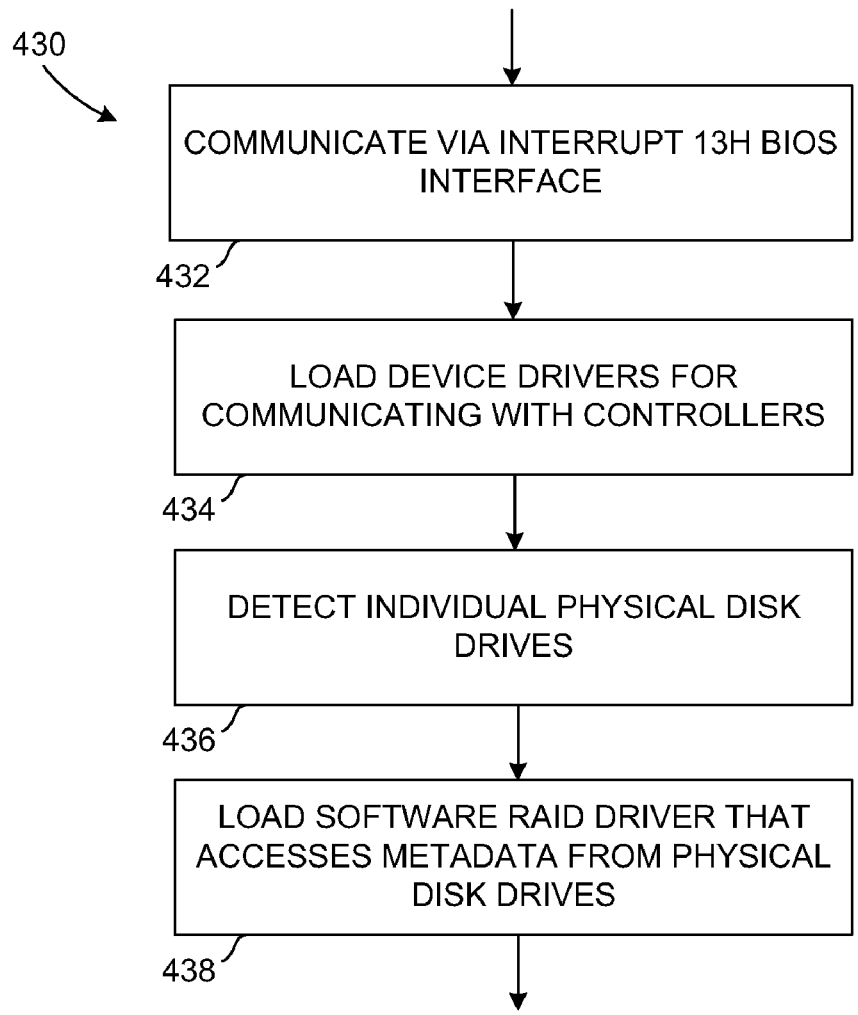

FIG. 4D shows an embodiment of a data protection method 430 comprising communicating 432 with an interrupt 13h BIOS interface and loading device drivers 434 for communicating with physical disk driver controllers. Individual physical disk drives are detected 436 and a software RAID driver can be loaded 438 that accesses metadata resident on the physical disk drives to detect and identify RAID classification of the RAID volume formed by the physical disk drives.

The configuration of bootable RAID support in System ROM enables several improvements in functionality. For example, the illustrative RAID support can span multiple controllers. If more than one controller is present, the executable code in System ROM can form variable RAID levels, such as RAID 5, across the multiple controllers and/or adapters. In contrast, a hardware RAID implementation on a single RAID controller card can only support RAID protection on the drives attached to that controller.

The illustrative RAID protection implemented in System ROM supports bootstrap loading when one or more of the disk drives is degraded. For example, in a RAID 5 implementation, the illustrative system and technique executes RAID from the System ROM and therefore enables bootstrap loading from a degraded RAID 5 disk by presenting a virtual disk to a host and implementing RAID functionality across multiple drives.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computing system comprising:
a persistent storage comprising a system code configured prior to boot to implement Redundant Array of Independent Disks (RAID) protection on a boot volume during boot, the system code operational as a distinct RAID device that implements RAID mapping and is configured to coexist with software RAID drivers subsequently loaded by an operating system.

2. The system of claim 1, comprising:
the system code configured to implement the Redundant Array of Independent Disks (RAID) protection adapted for supporting a plurality of different disks and disk controllers for designs of a plurality of manufacturers.

3. The system of claim 1, comprising:
the system code configured to execute during system Power-On Self Test and concealing a configurable number of physical disk drives attached to a disk controller from an operating system.

4. The system of claim 1, comprising:
the system code configured to implement the Redundant Array of Independent Disks (RAID) protection adapted to function in cooperation with a plurality of disk controllers for RAID-on-RAID support and extended redundancy protection.

5. The system of claim 1, comprising:
the system code configured to logically re-vector into an interrupt execution chain that performs a plurality of disk access functions during operating system loading, the system code logically re-vectoring into the interrupt execution chain subsequent to re-vectoring into the interrupt execution chain by at least one hardware disk controller.

6. The system of claim 5, comprising:
the system code configured for, subsequent to logically re-vectoring into the interrupt execution chain, executing an interrupt function specifying a target physical disk drive.

7. The system of claim 5, wherein the interrupt execution chain comprises a BIOS interrupt 13h execution chain.

8. The system of claim 1, comprising:
the system code configured to remap disk units that are not Redundant Array of Independent Disks (RAID) volumes.

9. The system of claim 1, comprising:
the system code configured to perform an operating system bootstrap process that communicates with an interrupt 13h Basic Integrated Operating System (BIOS) interface, load device drivers for communicating with physical disk driver controllers, and detect individual physical disk drives.

10. The system of claim 9, comprising:
the operating system bootstrap process configured to load a software Redundant Array of Independent Disk (RAID) driver to recognize that the individual physical disk drives operate as a RAID volume.

11. The system of claim 9, comprising:
the operating system bootstrap process configured to load a software Redundant Array of Independent Disk (RAID) driver that accesses metadata resident on the physical disk drives to detect and identify RAID classification of the RAID volume formed by the physical disk drives.

12. A method for protecting data in a data processing system comprising:
executing initialization code of at least one hard disk controller via Option Read-Only Memory (ROM) of the at least one hard disk controller;
executing a system code from a persistent storage to bootstrap load an operating system from a boot volume; and
implementing Redundant Array of Independent Disks (RAID) protection on the boot volume via the system code before bootstrap loading, wherein implementing comprises reading metadata from a plurality of disk drives and creating virtual RAID volumes based on the metadata.

13. The method of claim 12, comprising:
creating virtual Redundant Array of Independent Disks (RAID) volumes comprising:
examining configuration information on metadata read from the disk drive plurality;
validating RAID configuration;
logically re-vectoring interrupt 13h vector whereby subsequent 13h calls are diverted to the persistent storage and not Option ROM;
assigning new interrupt 13h unit numbers to virtual disks and unconfigured physical disks; and
updating state of virtual units.

14. The method of claim 12, comprising:
handling 13h interrupts in persistent storage in a system comprising: examining interrupt 13h unit number for validity;
for a non-RAID unit number, updating a drive number register and forwarding to an original saved interrupt 13h device handler;
for a RAID unit number, determining whether an interrupt 13h request is a disk input/output (I/O) request;
for a request that is not a disk I/O request, process the request; for a disk I/O request:
accessing virtual unit configuration information for a virtual drive;
dividing request into multiple requests for physical drives;
sending Read/Write (R/W) requests to physical drives for the multiple requests.

15. The method of claim 12, comprising:
supporting Redundant Array of Independent Disks (RAID) protection for a plurality of different disks and disk controllers for designs of a plurality of manufacturers;
supporting RAID protection in combination with software RAID drivers loaded by an operating system after system bootstrap loading; and
supporting RAID protection in cooperation with a plurality of hardware RAID controllers in a respective plurality of hardware disk controllers for RAID-on-RAID support and extended redundancy protection.

16. The method of claim 12, comprising:
executing during system Power-On Self Test via the system code; and
concealing a configurable number of physical disk drives attached to a disk controller from an operating system during the bootstrap loading.

17. The method of claim 12, comprising:
re-vectoring into the interrupt execution chain by the at least one hard disk controller;
logically re-vectoring into the interrupt execution chain that performs a plurality of disk access functions during operating system loading;
executing an interrupt function specifying a target physical disk drive; and
remapping, via the system code prior to bootstrap loading, system units that are not Redundant Array of Independent Disks (RAID) volumes.

18. The method of claim 17, wherein the BIOS interrupt execution chain comprises a BIOS interrupt 13h execution chain, and the BIOS interrupt 13h function comprises a BIOS interrupt 13h function.

19. The method of claim 12, comprising:
communicating with an interrupt 13h Basic Integrated Operating System (BIOS) interface;
loading device drivers for communicating with physical disk driver controllers;
detecting individual physical disk drives; and
loading a software Redundant Array of Independent Disk (RAID) driver that accesses metadata resident on the physical disk drives to detect and identify RAID classification of the RAID volume formed by the physical disk drives.

20. A data processing system comprising:
a processor;
at least one disk controller coupled to the processor; and
a persistent storage coupled to the processor and comprising a system code that implements Redundant Array of Independent Disks (RAID) protection on a boot volume and virtualizes component disk drives as a set of physical interrupt vector units, creating a new virtual interrupt vector unit out of the unit set, the system code configured to logically re-vector during boot into an interrupt execution chain that performs a plurality of disk access functions during operating system loading, the system code logically re-vectoring into the interrupt execution chain subsequent to re-vectoring into the interrupt execution chain by the at least one disk controller, and the system code configured to create virtual RAID volumes and to remap system units that are not RAID volumes.

* * * * *